United States Patent [19]

Daly et al.

[11] 4,415,244

[45] Nov. 15, 1983

[54] AUTOMATIC FOCUSING SYSTEM

[75] Inventors: William T. Daly, Rochester; Boris Gelman, Fairport; William R. Sanderson, Rochester, all of N.Y.

[73] Assignee: Telex Communications, Inc., Minneapolis, Minn.

[21] Appl. No.: 360,258

[22] Filed: Mar. 22, 1982

[51] Int. Cl.$^3$ .............................................. G03B 3/00
[52] U.S. Cl. .................................... 353/101; 353/69; 355/56; 354/25
[58] Field of Search ................... 353/101, 69; 355/56; 352/140; 354/31 F, 25 A; 250/204

[56] References Cited

U.S. PATENT DOCUMENTS

| 3,120,779 | 2/1964 | Mulch et al. ................... 353/69 X |
| 3,205,766 | 9/1965 | Ewald et al. ...................... 353/69 |
| 3,249,001 | 5/1966 | Stauffer .............................. 353/101 |
| 3,249,006 | 5/1966 | Stauffer .............................. 353/101 |
| 3,249,007 | 5/1966 | Stauffer .............................. 353/101 |
| 3,296,924 | 1/1967 | Levin et al. ......................... 353/69 |
| 3,301,129 | 1/1967 | Henriksen .......................... 353/69 |
| 3,342,102 | 9/1967 | Maxon ................................ 353/69 |
| 3,349,667 | 10/1967 | Levin et al. ........................ 353/69 |
| 3,447,867 | 6/1969 | Nerwin .............................. 352/140 |
| 3,466,125 | 1/1969 | Jordan et al. ...................... 353/101 |
| 3,517,992 | 6/1970 | Holle .................................. 353/101 |
| 3,536,392 | 10/1970 | Szymber ........................... 353/101 |
| 3,537,791 | 11/1970 | Kessler et al. ...................... 353/101 |
| 3,617,119 | 11/1971 | Pagel ................................. 352/140 |
| 3,628,857 | 12/1971 | Harvey .............................. 353/101 |
| 3,628,863 | 12/1971 | Kottler et al. ...................... 353/101 |
| 3,631,785 | 1/1972 | Perlman et al. ....................... 95/44 |
| 3,672,757 | 6/1972 | Szymber et al. .................... 353/101 |
| 3,744,894 | 7/1973 | Hoadley ............................. 353/101 |
| 3,804,505 | 4/1974 | Wagensonner et al. ............ 353/101 |
| 3,813,155 | 5/1974 | Szymber et al. .................... 353/101 |
| 3,822,091 | 7/1974 | Altmann ............................. 353/69 |
| 3,917,394 | 11/1975 | Sturdevant ......................... 353/101 |

FOREIGN PATENT DOCUMENTS

| 1472300 | 11/1966 | Fed. Rep. of Germany ...... 353/101 |
| 1235427 | 6/1971 | United Kingdom ............... 353/101 |

Primary Examiner—Stephen Marcus
Assistant Examiner—William R. Sharp
Attorney, Agent, or Firm—Peterson, Palmatier, Sturm, Sjoquist & Baker, Ltd.

[57] ABSTRACT

An automatic focusing system for a slide projector which utilizes a pair of photocells is provided with a non-linear response characteristic to introduce a change in the sensor balance point when a glass covered film slide is projected as opposed to when an open film slide is projected. Accordingly, glass covered film slides and open film slides can be randomly intermixed without changing the projector focus.

6 Claims, 7 Drawing Figures

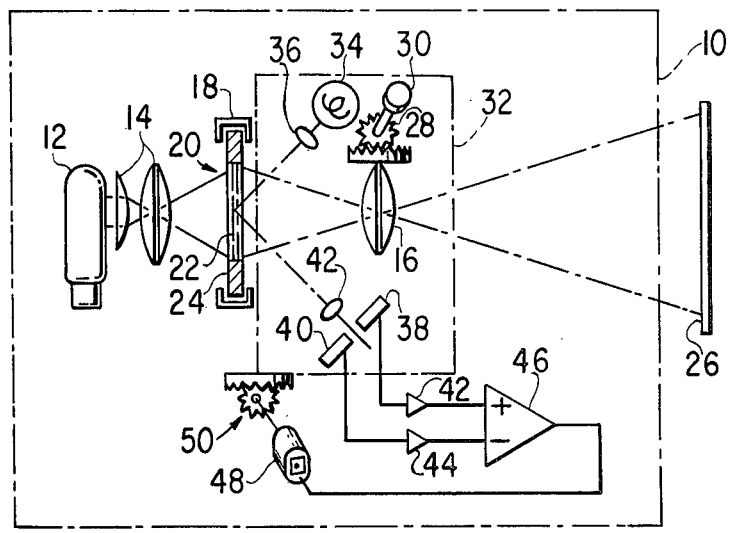
Fig. 1
PRIOR ART
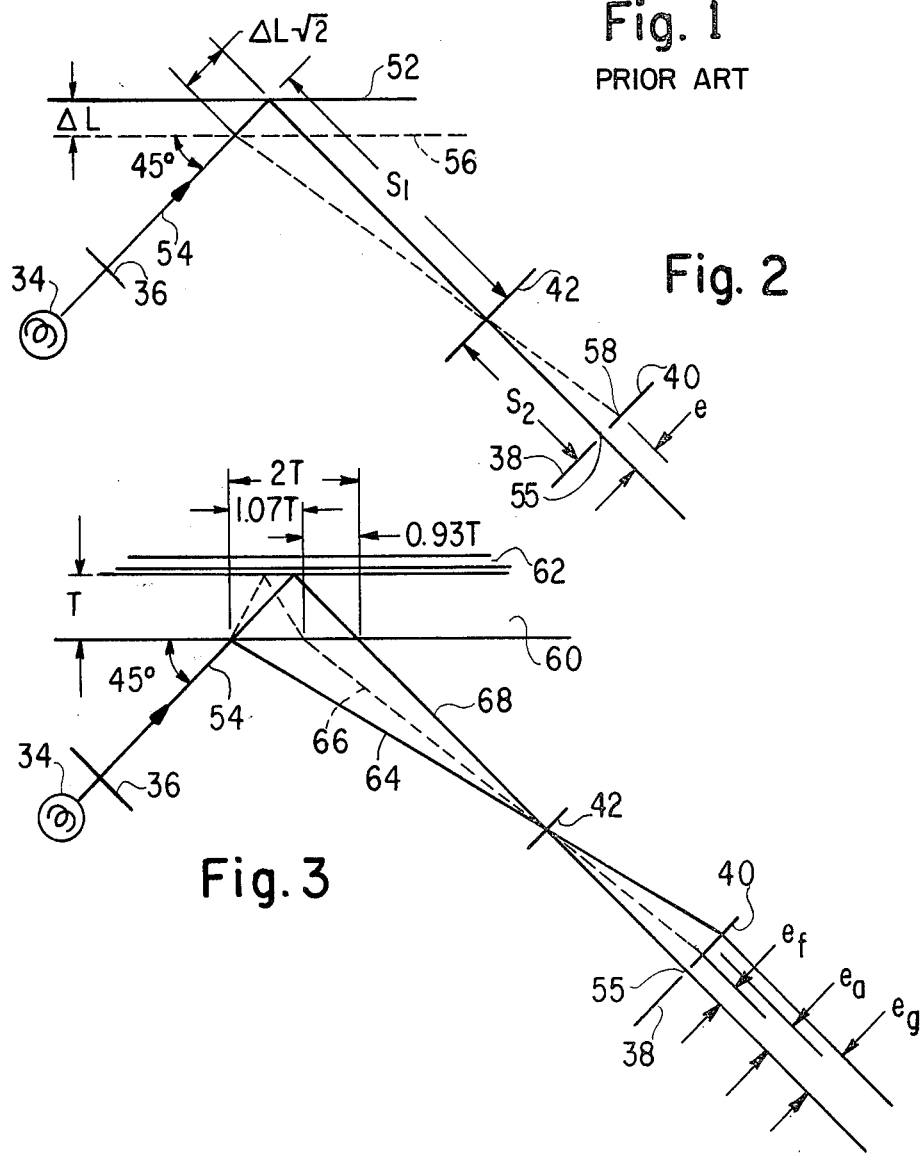
Fig. 2
Fig. 3

AUTOMATIC FOCUSING SYSTEM

BACKGROUND OF THE INVENTION

This invention relates to slide projectors and, more particularly, to an automatic focusing system for such a projector which is insensitive to the type of slide being projected for maintaining proper projection focus.

In the past, various types of automatic focusing systems for slide projectors have been proposed and implemented. In a relatively conventional automatic focusing system, the automatic focusing elements and the projection lens are mounted on a carriage which is movable with respect to the base of the projector. This carriage is between the projection station which holds a slide being projected and the surface upon which the image of the slide is projected for viewing. The projection lens is movable by an operator relative to the carriage to bring the image of the projected slide into focus on the viewing surface. The entire carriage, including the projection lens, is movable under control of the automatic focusing system to maintain constant the distance between the film within the slide mount at the projection station and the carriage, and hence between the slide film and the projection lens. Accordingly, although the film may "pop" with respect to the slide mount at the projection station after being exposed to heat from the projection lamp, focus is maintained. This has been accomplished in the past by reflecting light from the slide film onto a dual photocell arrangement. The outputs of the photocells are compared and the resultant comparison is utilized for energizing a reversible motor which moves the carriage relative to the slide film in order to balance the amount of light received by the two photocells.

While the aforedescribed arrangement may be generally satisfactory, under certain conditions of operation such an arrangement proves to be inadequate. One of the conditions under which the aforedescribed prior art arrangement becomes inadequate is when the slides being projected are randomly intermixed according to type. There are essentially two types of slides, an open, or bare, film slide and a glass covered film slide. If a system of the aforedescribed type is focused utilizing an open film slide, when a glass covered slide is at the projection station additional reflecting surfaces due to the presence of the glass change both the amount and distribution of the reflected light on the photocells. Accordingly, when the system moves the carriage to balance this light distribution, the projected image becomes defocused. It is therefore a specific object of the present invention to provide an automatic focusing system which allows the use of intermixed open film slides and glass covered film slides.

SUMMARY OF THE INVENTION

The foregoing and additional objects are attained in accordance with the principles of this invention by providing an automatic focusing system for a slide projector which responds to the position of an image reflected from a slide positioned at a projection station and wherein the intensity weighted image center is shifted in both position and total energy for a glass covered film slide as compared with an open film slide. The automatic focusing system according to this invention includes means responsive to the shift in total energy of the image for changing the response of the system to the position of the intensity weighted image center.

In accordance with an aspect of this invention, the automatic focusing system includes a source of radiant energy, means for directing radiant energy from the source to a slide positioned at a projection station within the projector and first and second radiant energy sensitive elements mounted to receive radiant energy reflected from the slide. When an open film slide is positioned at the proper distance from the projection lens, the first radiant energy sensitive element receives more radiant energy than the second radiant energy sensitive element. When a glass covered film slide is positioned the proper distance from the projection lens, the second radiant energy sensitive element receives more radiant energy than the first radiant energy sensitive element. Additionally, more radiant energy is reflected by a glass covered film slide than by an open film slide. The first and second radiant energy sensitive elements provide respective output signals related to the amount of radiant energy received thereby and means are provided for receiving the output signals and responding to both the absolute and relative levels of the output signals to maintain the proper distance between the slide and the projection lens independent of whether an open film slide or a glass covered film slide is at the projection station.

BRIEF DESCRIPTION OF THE DRAWINGS

The foregoing will be more readily apparent upon reading the following description in conjunction with the drawings wherein:

FIG. 1 schematically depicts a prior art automatic focusing system for a slide projector in which this invention may be incorporated;

FIG. 2 illustrates the automatic focusing system geometry when an open film slide is at the projection station;

FIG. 3 illustrates the automatic focusing system geometry when a glass covered film slide is at the projection station before compensating for the glass;

DETAILED DESCRIPTION

Figure 4:
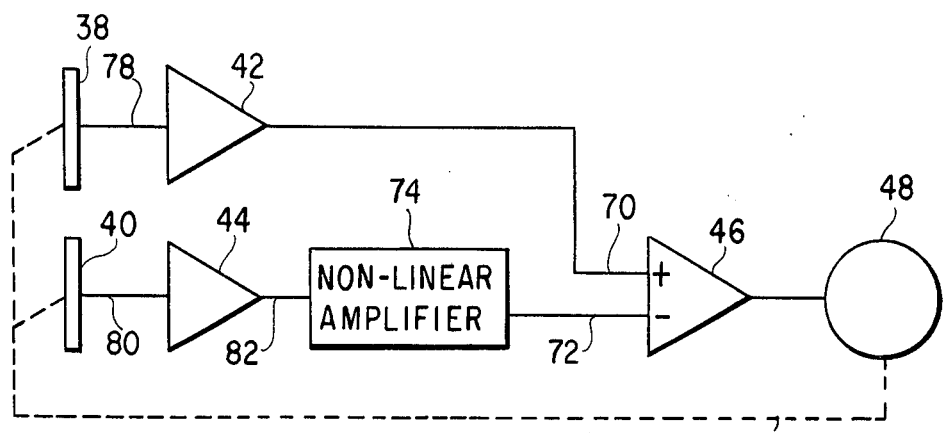
FIG. 4 is a block diagram illustrating a circuit arrangement constructed in accordance with the principles of this invention.

Referring now to the drawings, wherein like elements in different figures thereof have the same reference character applied thereto, FIG. 1 is a schematic representation of a prior art slide projector having incorporated therein an automatic focusing system. The slide projector includes a base, designated generally by the reference numeral 10, a projection lamp 12, lenses 14 for concentrating the light output of the projection lamp 12 and a projection lens 16. The projector is further provided with a projection station 18 adapted to have positioned thereat a slide 20, which includes a film 22 held in a mount 24 defining an image area to be projected along the projection axis of the projection lens 16 onto a viewing surface 26, in a conventional manner. The projector is further provided with a manual focusing mechanism 28 which illustratively includes a knob 30 which is accessible to an operator and manipulatable thereby to move the lens 16 along its projection axis to establish a preferred condition of coincidence of the focal plane of the projection lens 16 with an image plane defined by the image area of the slide 20 positioned at the projection station 18 so that the projection of the image area of the slide 20 through the projection lens 16 onto the viewing surface 26 is optically focused for viewing thereof.

When the aforedescribed projector is provided with a typical prior art automatic focusing system, the projection lens 16 and the automatic focusing system may be mounted on a carriage 32 which is in turn mounted on the base 10 for movement relative thereto. One such typical prior art automatic focusing system includes a light source 34, a lens 36 for directing light from the light source 34 to the image plane defined by the slide 20 positioned at the projection station 18, a light detector including first and second substantially identical photocells 38 and 40, respectively, and a lens 42 for focusing the image of the light source 34 which is reflected from the image area of the slide 20 onto the detector plane defined by the photocells 38 and 40. The outputs of each of the photocells 38 and 40 are amplified by amplifiers 42 and 44, respectively, and these amplified signals are transmitted to a difference amplifier 46 whose output is coupled to a reversible motor 48. The output shaft of the reversible motor 48 is coupled to an arrangement 50 for moving the carriage 32 relative to the base 10 in a direction substantially parallel to the projection axis of the projection lens 16.

In operation, when the projector is turned on and the automatic focusing system made effective, by means not shown, the reflected image of the lamp 34 is directed to the photocells 38 and 40. If the light of this reflected image is balanced so that equal amounts fall upon the photocells 38 and 40, there are equal inputs to the difference amplifier 46 and there is no output therefrom. However, if one of the photocells 38, 40 receives more light than the other, the inputs to the difference amplifier 46 are unequal and there will be an output from the difference amplifier 46 which is applied to the reversible motor 48. The output of the difference amplifier 46 has a polarity and magnitude which depends upon which of the photocells 38, 40 receives more light and how great the imbalance actually is. The described automatic focusing system is arranged so that the reversible motor 48 receives a signal which causes it to move the carriage 32 in a direction which tends to reduce this imbalance. Thus, the automatic focusing system operates as a feedback controlled servo system which maintains the carriage 32 at a predetermined distance from the image plane defined by a slide 20 at the projection station 18. The operator of the projector may then adjust the position of the projection lens 16 relative to the carriage 32, via the knob 30, to optically focus the projected image on the viewing surface 26. So long as the automatic focusing system is effective, this manual adjustment need only be done once, as the automatic focusing system will thereafter maintain the carriage 32, and hence the projection lens 16, a fixed distance from the image plane defined by the image area of the slide 20 at the projection station 18, no matter whether the slide 20 "pops" due to heat from the projection lamp 12 or some subsequent slide is slightly displaced at the projection station 18 from the position occupied by the slide utilized to focus the lens 16, as is well known in the art.

FIG. 2 illustrates the geometry of the above-described automatic focusing system when an open film slide is positioned at the image plane 52 and the carriage 32 is the proper distance from the image plane 52. With this set of conditions, a ray of light 54 which strikes the film at the plane 52 at an angle of 45°, for example, will be reflected from the film at the plane 52 and the centerline of the reflected image of the source 34 will be focused to a point 55 intermediate the two photocells 38 and 40. However, if the film is displaced by a distance $\Delta L$ to a new plane 56, the centerline of the image of the source 34 will be displaced to a point 58 on the photocell 40. The error distance "e" between the points 55 and 58 may be calculated to be $$e = \frac{S_2}{S_1} \Delta L \sqrt{2} \quad (1)$$

where $S_1$ is the distance along a 45° angle from the plane 52 to the lens 42 and $S_2$ is the distance from the lens 42 to the plane of the photocells 38 and 40. Accordingly, the carriage 32 must be moved by the automatic focusing system an incremental distance $\Delta L$ as set forth in the following equation:

$$\Delta L = \frac{eS_1}{S_2 \sqrt{2}} \quad (2)$$

FIG. 3 shows the geometry when a glass covered film slide is at the projection station 18. In this case, the glass 60 covering the film 62 has a thickness T. If the film 62 were properly positioned at the plane 52 (FIG. 2) with respect to the carriage 32, the carriage 32 would have to be moved a distance T-T/n, where n is the index of refraction of the glass 60, in order to restore the system to focus to account for the refractive index of the glass 60, as is well known in the art. However, the automatic focusing system according to the prior art is sensitive to changes in refractive index in a different manner and is primarily sensitive to the location of surfaces that reflect light onto the photocells 38 and 40. As shown in FIG. 3, the centerline of the image of the light source 34 is directed by the lens 36 along the line 54 at an angle of 45° to the plane of the glass 60 and the slide 62. Some of this light is reflected from the front surface of the glass 60, as shown by the solid line 64, and some of this light is reflected from the rear surface of the glass 60 and the film 62 in contact therewith, as shown by the broken line 66, this path being bent due to the refractive index of the glass 60. The line 68 shows the path that would have been taken had there been no glass and the ray 54 were reflected only from the film 62. The shift of brightness, $e_f$, of the centerline of the image of the light source 34 after being reflected by the rear of the glass 60 and the front of the film 62 is given by the following equation:

$$e_f = \frac{S_2}{S_1} \frac{0.93}{\sqrt{2}} T \quad (3)$$

Similarly, the shift of brightness, $e_g$, of the centerline of the image of the light source 34 after being reflected by the front surface of the glass 60 is given by the following equation:

$$e_g = \frac{S_2}{S_1} T\sqrt{2} \tag{4}$$

Assuming that the thickness of the glass T equals 0.027 inches, the index of refraction of the glass 60 n=1.5, the reflectivity of the rear surface of the glass 60 and the film 62 in contact therewith is 2.8 times the reflectivity of the front surface of the glass 60, and setting the ratio $S_2/S_1=0.707$, equations(3) and (4) can be utilized to find the shift of brightness, $e_a$ of the weighted center of the composite image of the light source 34 to be $e_a=0.0163$ inches. Using equation (2) and the calculated value of $e_a$, it is found that the system must be moved 0.0163 inches to restore balance at the photocells 38 and 40. However, as was stated above, the lens must be moved $T-T/n=0.009$ inches to restore focus. Accordingly, there is a net focus error equal to $0.0163-0.009=0.0073$ inches of uncompensated error which is visible with good projection systems at large apertures. It is this uncompensated error which is corrected by the present invention.

To compensate for the difference in level and distribution of light received by the photocells 38 and 40 when using a glass covered film slide as opposed to an open film slide, the resultant signal paths after the impinging light energy is converted into electrical energy must produce different responses at the point where they are compared for motor drive purposes, i.e., at the inputs to the difference amplifier 46. Additionally, at least one of the responses to image energy must be non-linear because of the difference in light received when a glass covered film slide is at the projection station as opposed to when an open film slide is at the projection station. There are a number of possible ways of accomplishing the desired result. For example, different photosensitive materials may be utilized for the two photocells 38 and 40. Alternatively, the areas of the two photocells 38 and 40 that are exposed to the image of the light source 34 may be non-symmetrically shaped to produce an unsymmetrical response. Yet another approach would be to use photoresistive cells with different resistors in series with each cell. Still another approach would be to use photodiode or phototransistor cells with different loads so that one amplifier output could approach the cell's nearly linear short circuit current response to radiant energy while the other amplifier output could approach proportionally to the cell's open circuit voltage.

Figure 5:
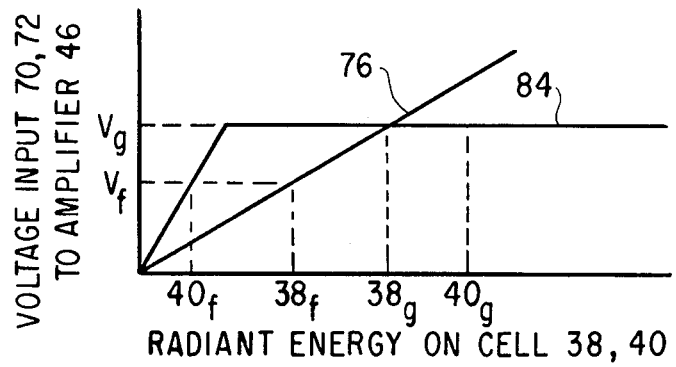
FIG. 5 is an idealized diagram useful for explaining the theory of operation of the circuitry shown in FIG. 4.

In accordance with the principles of this invention, the chosen approach is to use nearly matching photodiodes with unlike amplification of each of the cell's short circuit current. As shown in FIG. 4, the input 70 to the differential amplifier 46 driving the motor 48 is a voltage which is linearly proportional to the radiant energy on the cell 38. The other input 72 to the differential amplifier 46 has a non-linear amplifier 74 in its signal path. The non-linear amplifier 74 has a higher proportionality constant over a more limited radiant energy level. Beyond that limit, the voltage increases at a lower rate, or not at all. FIG. 5 shows an example of the response characteristics of the two photocell channels in terms of the voltage input to the amplifier 46 as a function of the radiant energy on the cells 38, 40. The curve 76 shows the voltage on the line 70 as a function of the amount of light received by the photocell 38. The output of the photocell 38 is a current on the lead 78 whose magnitude is directly proportional to the amount of light received by the photocell 38. This current is converted to a voltage and linearly amplified by the amplifier 42 to produce a voltage on the lead 70 which is a directly proportional linear function of the amount of light received by the photocell 38, in accordance with the curve 76. The photocell 40 converts the light received thereby to current on the lead 80, which current is converted to a voltage and linearly amplified by the amplifier 44 to provide a proportionally increasing linear voltage on the lead 82. The non-linear amplifier 74 has a linearly increasing slope up to a predetermined point and, in this example, has a zero slope beyond that point. Accordingly, the curve 84 shows the voltage on the line 72 as a function of the energy received by the photocell 40.

Referring to FIG. 5, when an open film slide is at the projection station 18 and the carriage 32 is the proper distance from the image plane 52 (FIG. 2) so that the projected image is in sharp focus on the viewing surface 26, the amount of radiant energy on the photocell 38 is shown in FIG. 5 as the point $38_f$ and the amount of energy incident on the photocell 40 is $40_f$. Accordingly, the balanced voltage $V_f$ is applied to both inputs 70, 72 of the difference amplifier 46, although different amounts of energy are incident upon the two photocells. Similarly, when a glass covered film slide is at the projection station 18 and the system is in focus, the amount of energy on the cell 38 is denoted by the point $38_g$ and the amount of energy on the cell 40 is denoted by the point $40_g$. The balanced voltage applied to the leads 70 and 72 is the voltage $V_g$, although again the amount of energy incident on the two photocells differs and in fact their relative magnitudes are reversed in the case of the glass covered film slide when compared to the case of the open film slide. It is thus seen that the inputs to the motor driver are balanced with both an open film slide and a glass covered film slide and accordingly, the system will be able to maintain proper focus for both an open film slide and a glass covered film slide. At this point, it should be noted that the upper slope of the curve 84 may be other than zero, as shown in FIG. 5, so long as the intersection of the point $38_g$ with the curve 76 is at the same level as the intersection of the point $40_g$ with the curve 84. As has been described, a glass covered film slide is focused precisely only when the glass thickness is the same as the glass thickness used for adjusting the circuit values, but the focus error is negligible for reasonable variations in glass thickness.

Figure 7:
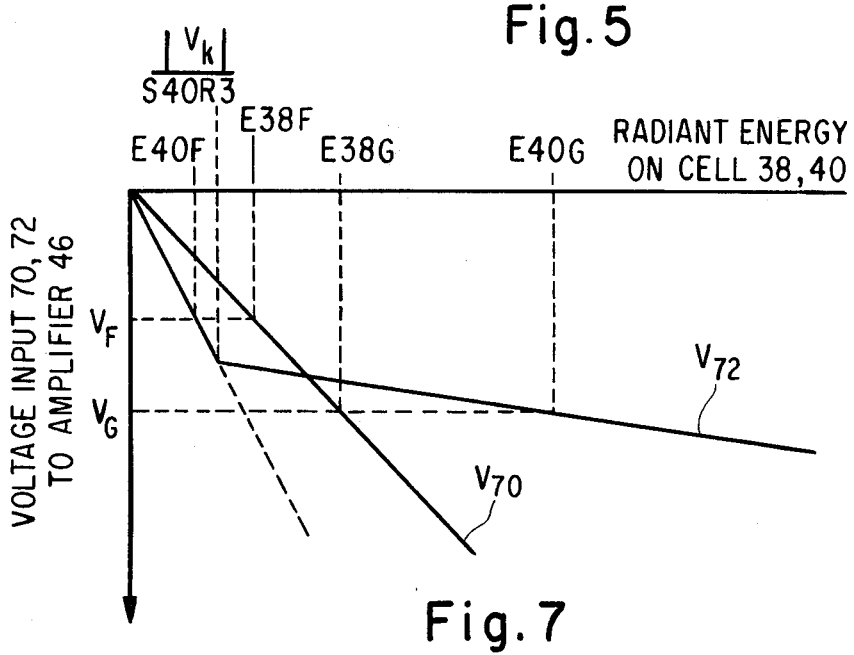
FIG. 7 is a diagram showing the amplification characteristics of the circuitry shown in FIG. 6.
Figure 6:
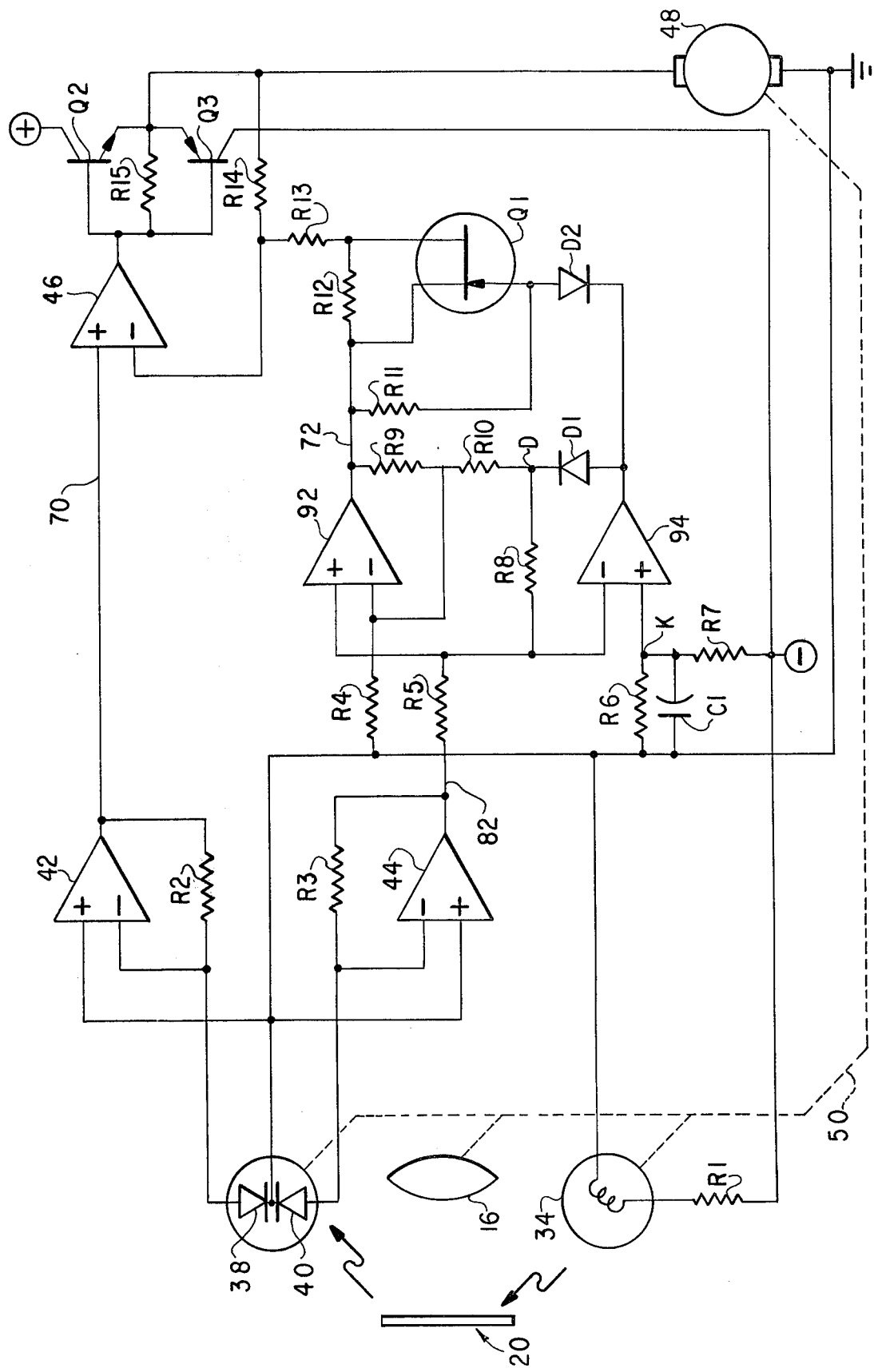
FIG. 6 is a detailed schematic circuit diagram of an illustrative embodiment of circuitry operating in accordance with the principles of this invention.

FIG. 6 is a detailed schematic diagram of an illustrative circuit which may be utilized to practice the present invention and FIG. 7 shows the response characteristics for the circuit of FIG. 6. Referring now to FIG. 6, the amplifiers 42 and 44 maintain virtual short circuits across the respective junctions of the photodiode cells 38 and 40 and convert each diode output current to a proportional voltage. Since the photodiodes 38 and 40 are loaded by a short circuit, their output currents on the leads 78 and 80, respectively, are directly proportional to the radiation they detect, over the range of interest. Thus, $$V_{70} = -R2I_{38} = -R2S_{38}E_{38} \tag{5}$$

and $$V_{82} = -R3I_{40} = -R3S_{40}E_{40} \tag{6}$$

where $V_{70}$ is the output voltage from the amplifier 42 on the lead 70; $V_{82}$ is the output voltage from the amplifier 44 on the lead 82; S is the radiant energy sensitivity of a cell; and E is the radiant energy detected by a cell. The output of the amplifier 42 is fed directly to the differential amplifier 46 and its output network consisting of the transistors Q2 and Q3 and the resistor R15 to drive the motor 48, while the output voltage of the amplifier 44 is modified by the amplifier 92 and 94 to produce the other input, which has the film-glass compensating non-linearity, to the amplifier 46. The remaining circuitry, surrounding the transistor Q1, equalizes the servo sensitivity to glass covered and open film slides. FIG. 7 shows the voltage inputs on the leads 70 and 72, $V_{70}$ and $V_{72}$ respectively, as functions of the radiant energy detected by the cells 38 and 40. The voltage $V_{70}$ is a linear function of the energy detected by the cell 38 and has a slope equal to $-R2S_{38}$, as set forth in equation (5) above. The voltage $V_{72}$ is a non-linear function of the radiant energy detected by the cell 40 and is composed of two linear portions, the first for lower levels of detected radiant energy, covering the situation where an open film slide is at the projection station, and the second portion for higher detected radiant energy levels, covering the situation where a glass covered film slide is at the projection station.

If a voltage proportional to $V_{70}-V_{72}$ is applied to a motor mechanically connected so that any positive voltage decreases the sum of the distance between the light source 34 to the center of the film plane 52 and between the center of the film plane 52 and the center of the photocells 38, 40, the fraction of the image of the light source 34 falling on the cell 38 will be reduced, while the fraction falling on the cell 40 will be increased. This will continue until $V_{70}$ equals $V_{72}$. If the system overshoots, or if the automatic focusing elements start out too close to the film plane 52, the motor voltage will be negative, driving the motor in the other direction until again $V_{70}$ equals $V_{72}$. If $V_F = V_{70} = V_{72}$ when the system is balanced with an open film slide in position, from FIG. 7 it will be seen that much more radiant energy is detected by the cell 38 than by the cell 40. Conversely, when the stronger wider image reflected off a glass covered film slide is divided so that the system is in balance with $V_{70} = V_{72} = V_G$, it is seen that much more radiant energy is detected by the cell 40 than by the cell 38. It is this shift in the relative balance, E38F/E40F versus E38G/E40G that causes the projection lens 16 to be located at the appropriate different distance from the film, depending on whether or not the film is covered by glass. Referring again to FIG. 6, when $V_{82}$ is less negative than $V_K$ ($V_{82} > V_K$), where $V_K$ is the voltage at the junction point K which is the non-inverting input to the amplifier 94, the output of the amplifier 94 is held at its negative saturation level. This makes the voltage across the resistor R5 negligible, since the diode D1 is back biased and the voltage drop across the resistors R8 and R10 is the negligible offset voltage of the amplifier 92. Thus;

$$V_{72} = \left(1 + \frac{R9}{R4}\right) V_{82}, \text{ for } V_{82} > V_K \quad (7)$$

However, when $V_{82}$ is more negative than $V_K$ ($V_{82} < V_K$), the diode D1 conducts, holding the non-inverting input of the amplifier 92 at the level $V_K$, the voltage at the junction D, as follows:

$$V_D = V_K + \frac{R8}{R5}(V_K - V_{82}) \quad (8)$$

The output voltage of the amplifier 92 can then be calculated to be $$V_{72} = \left(1 + \frac{R9}{R4} - \frac{R8R9}{R5R10}\right) V_K + \frac{R8R9}{R5R10} V_{82}, \text{ for } V_{82} < V_K \quad (9)$$

The voltage applied to the motor, $V_M$, when not at the maximum or negative minimum that can be supplied by the driver circuitry is:

$$V_M = V_{70} + \frac{R14}{R}(V_{70} - V_{72}) \quad (10)$$

where:

$$R = R13 + \frac{R12 \, RQ1}{R12 + RQ1} \quad (11)$$

and RQ1 is the drain-source resistance of the transistor Q1. Accordingly, when R14/R is much greater than 1 the voltage applied to the motor 48 becomes $$V_M \approx \frac{R14}{R}(V_{70} - V_{72}) \quad (12)$$

The resistance R is changed by turning Q1 on or off depending on whether $V_{72}$ is above or below its knee value in order to make the servo sensitivity to glass covered film slides the same as it is with open film slides. Thus, the same comparator that puts the knee in the $V_{72}$ response (FIG. 7) may be used to change the gain of the motor driver.

For $V_{82} > V_K$, the amplifier 94 keeps the source to gate voltage of the transistor Q1 greater than its cut off value, making the drain-source resistance RQ1 of the transistor Q1 much greater than R12, so that the motor voltage becomes $$V_M \approx \frac{R14}{R12 + R13}(V_{70} - V_{92}) \quad (13)$$

For $V_{82} < V_K$, the diode D2 is back biased, permitting the resistor R11 to hold the transistor Q1 on, with its drain-source resistance RQ1 a small fraction of R13. Then, the voltage applied to the motor becomes $$V_M \approx \frac{R14}{R13}(V_{70} - V_{72}) \quad (14)$$

In summary, with $V_K$ being a negative predetermined voltage, when $E_{40} \leq |V_K|/R3S_{40}$, the motor voltage is $$V_M \approx \frac{R14}{R12 + R13}\left[-R2S_{38}E_{38} + \left(1 + \frac{R9}{R4}\right) R3S_{40}E_{40}\right] \quad (15)$$

and when $E_{40} \geq |V_K|/R3S_{40}$ then the motor voltage becomes $$V_M \approx \frac{R14}{R13}\left[ -R2S_{38}E_{38} - \left(1 + \frac{R9}{R4} - \frac{R8R9}{R5R10}\right)V_K + \right. \tag{16}$$

$$\left. \frac{R8R9}{R5R10} R3S_{40}E_{40} \right]$$

Accordingly, there has been disclosed an automatic focusing system for a slide projector which is insensitive to the type of slide being projected and which maintains proper projection focus. It is understood that the above-described embodiment is merely illustrative of the application of the principles of this invention. For example, although the disclosed embodiment has both automatic focusing elements (the radiant energy source and the radiant energy detector) and the projection lens mounted on a single driven carriage, the principles of this invention may be applied to variants of this arrangement. Thus, the automatic focusing system may have only one of the automatic focusing elements mounted on the driven carriage with the other element fixed and the lens mounted on a separate carriage which is coupled to the driven carriage for proportional movement therewith, the porportionality constant depending on, among other factors, the angular relationship between the incident and reflected light. Further, although the non-linear response characteristic has been disclosed as two straight line segments, this invention may also be practiced with a non-linearity which is a smooth curve having no sharp transistion points. Numerous other embodiments may be devised by those skilled in the art without departing from the spirit and scope of this invention, as defined by the appended claims.

I claim:

1. In a projector including a projection lens with a focal plane located a predetermined distance therebehind, said projector being adapted to project a series of slides, each of which comprises a film held in a mount defining an image area to be projected along the projection axis of said lens, and wherein the image area of said slide establishes an image plane when said slide is positioned at a projection station for projection thereof, the projector further including a base, a carriage mounted on said base for movement relative thereto, means for adjustably mounting said lens for movement with said carriage and for relative movement with respect to said carriage to establish a preferred condition of coincidence of said image and focal planes so that the projection of the image area through said projection lens onto a viewing surface is optically focused for viewing thereof, and reversible drive means operably connected to move said carriage relative to said base and said image plane in a direction substantially parallel to said projection axis, an automatic focusing system comprising:

a source of radiant energy;
means for directing radiant energy from said source to said image plane;
a radiant energy detector including first and second radiant energy sensitive elements adapted to receive radiant energy reflected from said image area at said image plane, during said preferred condition of coincidence of said focal and image planes said first radiant energy sensitive element receiving more radiant energy than said second radiant energy sensitive element when an open film slide is positioned at said projector station and said second radiant energy sensitive element receiving more radiant energy than said first radiant energy sensitive element when a glass covered film side is positioned at said projection station, more radiant energy being reflected by a glass covered film slide than by an open film slide, and each of said radiant energy sensitive elements providing respective output signals related to the amount of radiant energy individually received thereby;
means for coupling at least one of said radiant energy source and said radiant energy detector to said carriage for movement therewith; and
non-linear energizing means for receiving said output signals and effective to energize said reversible drive means in response to both the absolute and relative levels of said output signals so as to move said carriage to establish said preferred condition of coincidence of said focal and image planes independent of whether an open film slide or a glass covered film slide is positioned at said projection station.

2. The automatic focusing system according to claim 1 wherein said non-linear energizing means includes:

difference amplifier means having a pair of differential inputs coupled to receive respective input signals thereat and an output coupled to said drive means for providing a drive signal to said drive means corresponding in magnitude and polarity to the difference between the signals at said differential inputs;
linear amplifier means interposed between one of said radiant energy sensitive elements and one of said differential inputs for providing one of said input signals which is a linear function of one of said output signals; and
non-linear amplifier means interposed between the other of said radiant energy sensitive elements and the other of said differential inputs for providing the other of said input signals which is a non-linear function of the other of said output signals.

3. The automatic focusing system according to claim 2 wherein said linear amplifier means is associated with said first radiant energy sensitive element and said non-linear amplifier means is associated with said second radiant energy sensitive element.

4. The automatic focusing system according to claim 3 wherein:

said linear amplifier means has a response characteristic of the form $V_L = K_L E_1$ where $V_L$ is the voltage level of said one of said input signals, $K_I$ is a constant, and $E_1$ is the amount of radiant energy received by said first radiant energy sensitive element; and
said non-linear amplifier means has a response characteristic of the form $V_{NL} = K_{NL1} E_2$ for $E_2 < E_T$ and $V_{NL} = K_T + K_{NL2} E_2$ for $E_2 > E_T$ where $V_{NL}$ is the voltage level of said other of said input signals, $K_{NL1}$ is a constant having an absolute value greater than the absolute value of $K_L$, $K_{NL2}$ is a constant having an absolute value less than the absolute value of $K_L$, $K_T$ is a constant, $E_2$ is the amount of radiant energy received by said second radiant energy sensitive element, and $E_T$ is a threshold radiant energy level at said second radiant energy sensitive element between the amount of radiant energy received by reflection from an open film slide and the amount of radiant energy received by reflection from a glass covered film slide.

5. In an automatic focusing system for slide projector which responds to the position of an image reflected by a slide positioned at a projection station from a source of radiant energy and wherein said image is shifted in both position and intensity for a glass covered film slide as compared with an open film slide, the improvement comprising:

adaptive means responsive in a non-linear manner to the shift in intensity of said image for changing the image position response of said system.

6. The improvement according to claim 5 wherein said adaptive means includes:

a pair of radiant energy sensitive elements positioned to receive said reflected image, each of said elements providing an output signal related to the amount of radiant energy of said reflected image received thereby;

difference amplifier means having a pair of differential inputs coupled to receive respective input signals thereat and an output for providing a drive signal corresponding in magnitude and polarity to the difference between the signals at said differential inputs, said automatic focusing system utilizing said drive signal to maintain a projected image of said slide in focus on a viewing surface;

linear amplifier means interposed between one of said radiant energy sensitive elements and one of said differential inputs for providing one of said input signals which is a linear function of one of said output signals; and non-linear amplifier means interposed between the other of said radiant energy sensitive elements and the other of said differential inputs for providing the other of said input signals which is a non-linear function of the other of said output signals.

* * * * *

UNITED STATES PATENT AND TRADEMARK OFFICE
CERTIFICATE OF CORRECTION

PATENT NO. : 4,415,244

DATED : November 15, 1983

INVENTOR(S) : William T. Daly, et al

It is certified that error appears in the above-identified patent and that said Letters Patent is hereby corrected as shown below:

Column 10, line 51, delete "$K_i$" and substitute --$K_L$--.

Signed and Sealed this

Twenty-eighth Day of February 1984

[SEAL]

Attest:

GERALD J. MOSSINGHOFF

Attesting Officer     Commissioner of Patents and Trademarks